United States Patent
Mullen et al.

(10) Patent No.: US 10,208,854 B2
(45) Date of Patent: Feb. 19, 2019

(54) TERRAIN ADAPTIVE SHIFT SCHEDULING

(71) Applicant: Ford Global Technologies, LLC, Dearborn, MI (US)

(72) Inventors: Jonathan Thomas Mullen, Palo Alto, CA (US); Markian Oleh Diakiw, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 651 days.

(21) Appl. No.: 14/857,877

(22) Filed: Sep. 18, 2015

(65) Prior Publication Data

US 2017/0082191 A1    Mar. 23, 2017

(51) Int. Cl.
| F16H 61/02 | (2006.01) |
| F16H 59/66 | (2006.01) |
| F16H 59/18 | (2006.01) |
| F16H 61/00 | (2006.01) |

(52) U.S. Cl.
CPC ......... F16H 61/0213 (2013.01); F16H 59/66 (2013.01); F16H 59/18 (2013.01); *F16H 2059/663* (2013.01); *F16H 2059/666* (2013.01); *F16H 2061/0087* (2013.01); *F16H 2061/0096* (2013.01); *F16H 2061/0227* (2013.01)

(58) Field of Classification Search
None
See application file for complete search history.

(56) References Cited

U.S. PATENT DOCUMENTS

| 5,832,400 | A | * | 11/1998 | Takahashi | B60K 31/00 701/53 |
| 7,480,552 | B2 | * | 1/2009 | Bates | F16H 61/0213 701/51 |
| 8,099,220 | B2 | | 1/2012 | Kim et al. | |
| 2001/0049573 | A1 | * | 12/2001 | Ohashi | F16H 59/66 701/51 |
| 2005/0209775 | A1 | | 9/2005 | Entenmann | |
| 2013/0035829 | A1 | | 2/2013 | Tiberg | |
| 2014/0142822 | A1 | | 5/2014 | Li | |
| 2014/0277835 | A1 | | 9/2014 | Filev et al. | |
| 2015/0127199 | A1 | | 5/2015 | Zhao et al. | |
| 2015/0345621 | A1 | * | 12/2015 | Sujan | F16H 61/0213 701/58 |
| 2015/0345622 | A1 | * | 12/2015 | Sujan | F16H 61/0213 701/55 |
| 2016/0082970 | A1 | * | 3/2016 | Jeon | B60W 10/10 477/97 |

FOREIGN PATENT DOCUMENTS

EP    2789880 A2    10/2014

* cited by examiner

*Primary Examiner* — Timothy Hannon
(74) *Attorney, Agent, or Firm* — James Dottavio; Brooks Kushman P.C.

(57) ABSTRACT

A vehicle implements a method of selecting gear ratios that utilizes two shift schedules, one for flat terrain and one for hilly terrain. Initially, the vehicle switches between the shift schedules based on estimation of the road gradient of a recently traversed route. When the vehicle switched between the shift schedules, the vehicle stores location information associated with the switch. When stored information about previous shift schedule switches is available, the information is utilized, in combination with navigation system data, to switch shift schedules at more appropriate times.

17 Claims, 6 Drawing Sheets

TERRAIN ADAPTIVE SHIFT SCHEDULING

TECHNICAL FIELD

This disclosure relates to the field of automatic transmission controls. More particularly, this disclosure related to a method of adapting shift points based on terrain.

BACKGROUND

Many vehicles are used over a wide range of vehicle speeds, including both forward and reverse movement. Most types of internal combustion engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Figure 1:
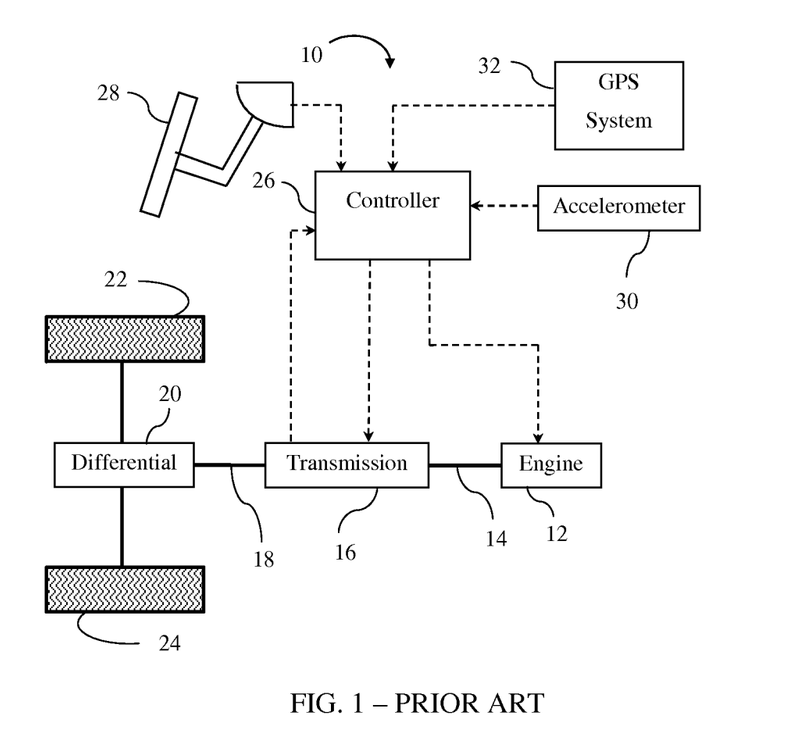
FIG. 1 is a schematic representation of a vehicle powertrain.

A rear wheel drive vehicle 10 is illustrated schematically in a FIG. 1. Solid like indicate the flow of mechanical power while dotted lines indicate the flow of information signals. Engine 12 provides the mechanical power and delivers the power to transmission input shaft 14. Transmission 16 transmits the power to driveshaft 18 while adjusting the speed to match vehicle speed to appropriate engine speed. Differential 20 divides the power between left and right drive wheels 22 and 24 allowing slight speed differences between the wheels as the vehicle turns a corner. In a rear wheel drive vehicle, the differential also changes the axis of rotation by 90 degrees and reduces the speed by a fixed final drive ratio. In a front wheel drive vehicle, the components may be oriented differently, and power may be transferred from the transmission gearbox to the differential by gearing rather than by a shaft.

Controller 26 provides signals to engine 12 to control the level of torque produced. For example, these signals may control the throttle opening, spark timing, etc. Controller 26 also provides signals to transmission 16 to control the speed ratio between the transmission input shaft 14 and the transmission output shaft which is fixed to driveshaft 18. This may include signals that control the torque capacity of clutches within transmission 16 which, when engaged in different combinations, establish different power flow paths with different speed ratios. Controller 26 receives signals from various sensors, such as speed signals from transmission 16 and the position of a driver operated accelerator pedal 28 that indicates a driver demanded torque. Controller 26 may also utilize signals from other sensors such as an accelerometer 30 and a vehicle navigation system 32, such as a system based on Global Positioning System (GPS) satellites.

Figure 2:
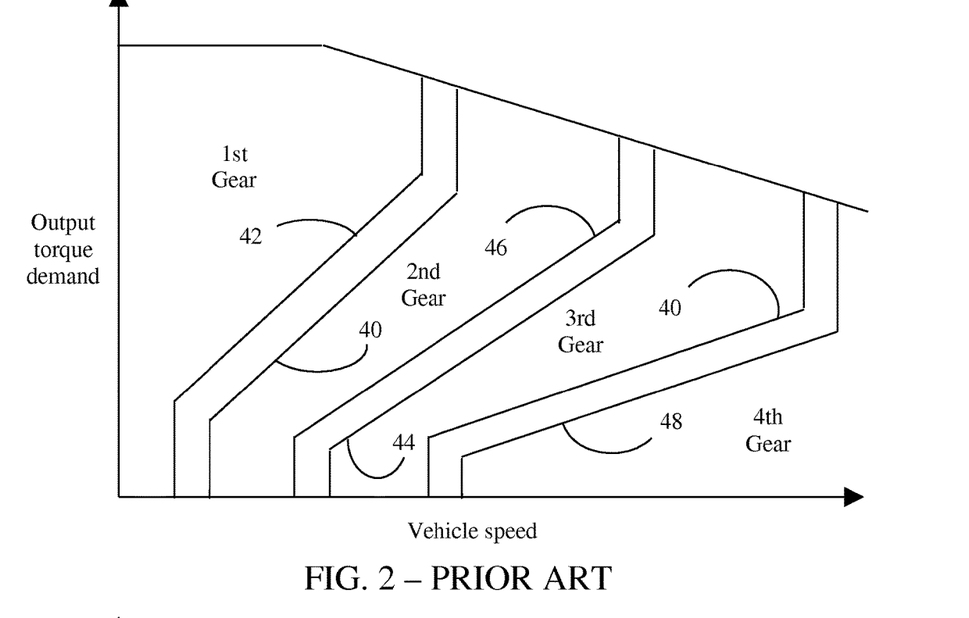
FIG. 2 is a graphical illustration of a first shift schedule.

Controller 26 decides when to command a shift from one gear ratio to another gear ratio. This decision making is called shift scheduling. Although the shift scheduling algorithm may consider many different inputs, the two primary inputs are typically an indication of speed and an indication of torque demand. A representative shift schedule for a four speed automatic transmission is depicted in FIG. 2. The horizontal axis represents vehicle speed or, equivalently, transmission output shaft speed which is proportional to vehicle speed. The vertical axis represents driver demanded output torque which is typically determined based on accelerator pedal position. At any given time, the current operating condition corresponds to a point in this graph. The controller schedules an upshift from 1st gear to 2nd gear whenever the current operating point crosses from the left side of 1-2 upshift line 40 to the right side of line 40. This can occur either because the vehicle increases in speed, because the driver reduces the demanded torque, or a combination of the two. The controller schedules a downshift from 2nd gear to 1st gear whenever the current operating point crosses from the right side of 2-1 downshift line 42 to the left side of line 42. Downshift line 42 is offset slightly from upshift line 40 in order to avoid frequent shifts in response to small changes in speed or demanded torque. Shifts between 2nd gear and 3rd gear are scheduled similarly using 2-3 upshift line 44 and 3-2 downshift line 46. Shifts between 3rd gear and 4th gear are scheduled similarly using 3-4 upshift line 48 and 4-3 downshift line 50. For transmissions with more than four ratios, the shift schedules have more lines, but are conceptually similar.

The location of each shift line is determined during a calibration process. Calibration requires compromises between various criteria. To generate maximum power, an internal combustion engine typically must rotate at high speed. Therefore, at high torque demands, the shift schedule tends to select lower numbered gears such that engine speed is near the power peak. At low torque demands, the schedule selects higher gear numbers such that the engine speed is near the most efficient operating speed for the corresponding power requirement. The location of some shift lines may be altered from a theoretical ideal to reduce the number of shifts requires for particular maneuvers or to satisfy other customer expectations.

SUMMARY OF THE DISCLOSURE

A method of selecting transmission gear ratios utilizes first and second shift schedules. The second shift schedule may indicate operation at higher engine speeds than the first shift schedule, making it more suitable for hilly terrain. The second shift schedule may also indicate use of gear states that provide engine braking whereas the first shift schedule would indicate gear states with over-running one way clutches. A counter is maintained indicating road gradients over previously traversed territory. Shifts are commanded using the first shift schedule based on changes in measured speed and driver demand. The measured speed may be proportional to a transmission output shaft speed. The driver demand may be based on an accelerator pedal position. In response to the counter exceeding a threshold, the second shift schedule is selected and shifts are commanded using the second shift schedule. Upon selecting the second shift schedule, a location associated with the change in shift schedule is recorded. The location may be a location that the vehicle traversed prior to the counter exceeding the threshold. In response to subsequent operation of the vehicle in the vicinity of the location, the second shift schedule is selected before the counter exceeds the threshold. A navigation system may be used to determine when the vehicle is operating in the vicinity of the location.

A method of operating a vehicle may behave differently on different traversals of a route. During an initial traversal of the route, the vehicle shifts a transmission according to a first shift schedule and switches to a second shift schedule at a location in response to observed road gradients along the route. During a subsequent traversal of the route, the vehicle switches to the second shift schedule before reaching the location based on navigation system data and stored data about the earlier schedule switch. After switching to the second shift schedule, the vehicle may downshift at a speed and driver demand at which no downshift would be performed according to the first shift schedule. After switching to the second shift schedule, the vehicle may maintain a present gear state at a speed and driver demand at which an upshift would be performed according to the first shift schedule. After switching to the second shift schedule, the vehicle may select a gear state that provides engine braking at a speed and driver demand at which a gear state with an over-running clutch would have been selected according to the first shift schedule.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 3:
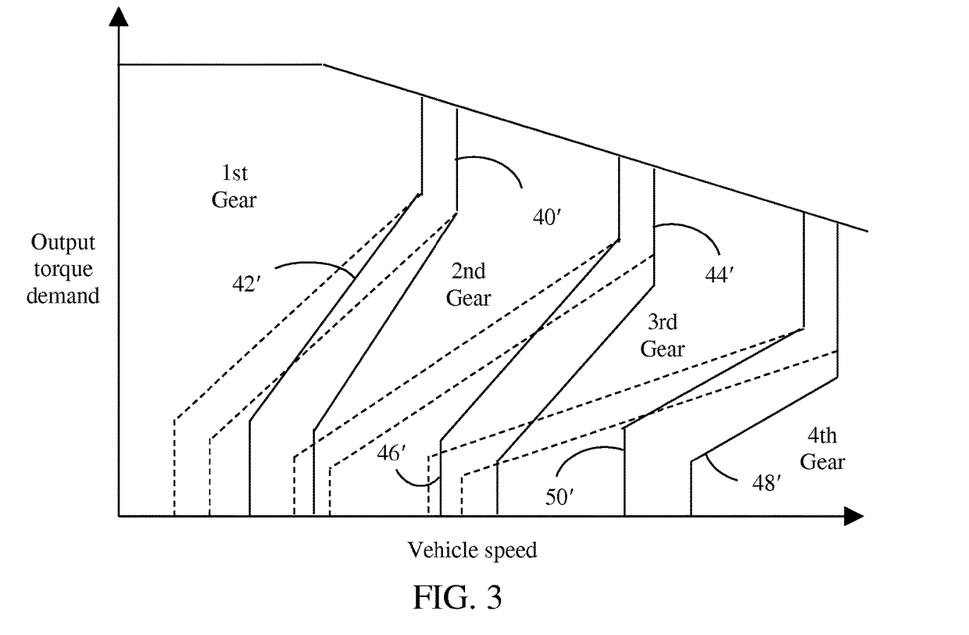
FIG. 3 is a graphical illustration of a second shift schedule more suitable for hilly terrain than the shift schedule of FIG. 2.

In mountainous terrain, shifting according to the default shift schedule of FIG. 2 may be unsatisfactory. Driver's demand much more output torque on uphill grades and much less torque, or even negative torque, on downhill grades. This results in very frequent shifting. Although some increase in shifting is desirable, too much shifting is annoying to vehicle occupants. FIG. 3 shows a modified shift schedule suitable for mountainous terrain. The reference numerals for each shift are the same as in FIG. 1 but with a prime ('). The shift lines from the default schedule of FIG. 2 are reproduced as dotted lines for reference. Notice that the lines of the mountainous shift schedule are positioned to the right such that the transmission tends to be in a lower numbered gear. In some transmissions, some of the lower numbered gears ordinarily only transmit positive torque. If the vehicle coast downhill in one of these gears, a one way clutch overruns allowing the engine to run at idle speed. Generally, it is possible to engage one or more friction clutches in order to force the engine speed and output shaft speed to follow the usual ratio for that gear while transmitting torque from the output shaft to raise the engine speed. Doing this causes the engine to act as a brake which is often desirable on steep downgrades. In addition to changing the shift point calibrations, the mountainous shift schedule may utilize the gear state that provides engine braking instead of the corresponding gear state with a one way clutch.

Figure 4:
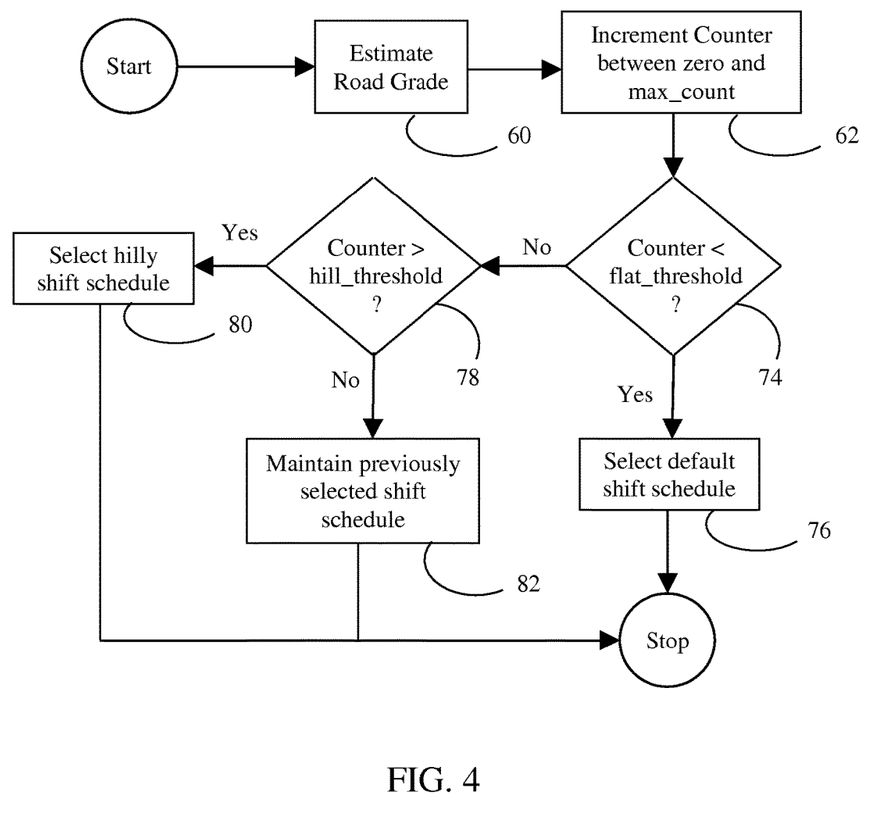
FIG. 4 is a flow chart for a process of selecting between two shift schedules, such as the shift schedules of FIGS. 2 and 3.
Figure 5:
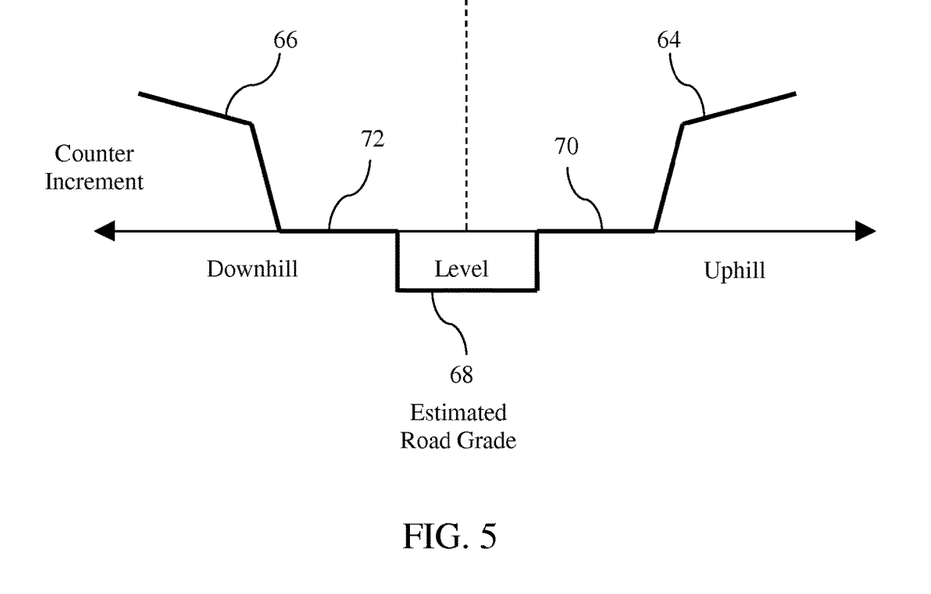
FIG. 5 is a graphical representation of a function relating a counter increment to a road grade.

To determine when to use the mountainous shift schedule, the controller utilizes a counter as indicated in the flow chart of FIG. 4, which is executed at regular intervals. The interval may be defined as a particular distance traveled or as a particular amount of time. If the interval is an amount of time, the routine may be executed only when the vehicle speed is above a speed threshold to avoid changing the counter while parked on a grade. At each interval, the controller estimates the current road grade at 60. For example, the controller may estimate road grade by comparing the derivative of vehicle speed as determined by speed sensors to the reading of accelerometer 30. At 62, the controller increments the counter by an amount that depends upon the current road gradient, as indicated in FIG. 5. The counter is incremented by a large positive amount if the current road gradient in steep, either uphill or downhill, as indicated at 64 and 66. The counter is decremented if the road is nearly level as shown at 68. Consequently, the counter tends to increase when the terrain is mountainous and tends to decrease when the terrain is flat. At moderate uphill or downhill grades, as shown at 70 and 72, the counter is neither incremented nor decrements. The counter is not decremented below zero and in not incremented above a predetermined upper limit.

If the counter is less than a predetermined flat terrain threshold, as determined at 74, the controller selects the default shift schedule of FIG. 2 at 76. Sometimes, this switch may trigger an upshift. Similarly, if the counter is greater than a predetermined hilly threshold, as determined at 78, the controller selects the mountainous shift schedule of FIG. 3 at 80. This schedule switch may result in a downshift. The hilly threshold is set higher than the flat terrain threshold to avoid frequent switching back and forth on intermediate terrain, which could result in shifting behavior which the vehicle occupants might find unpredictable and therefore annoying. If the counter is between the two thresholds, at 82 the controller continues using whichever shift schedule was previously selected.

Figure 6:
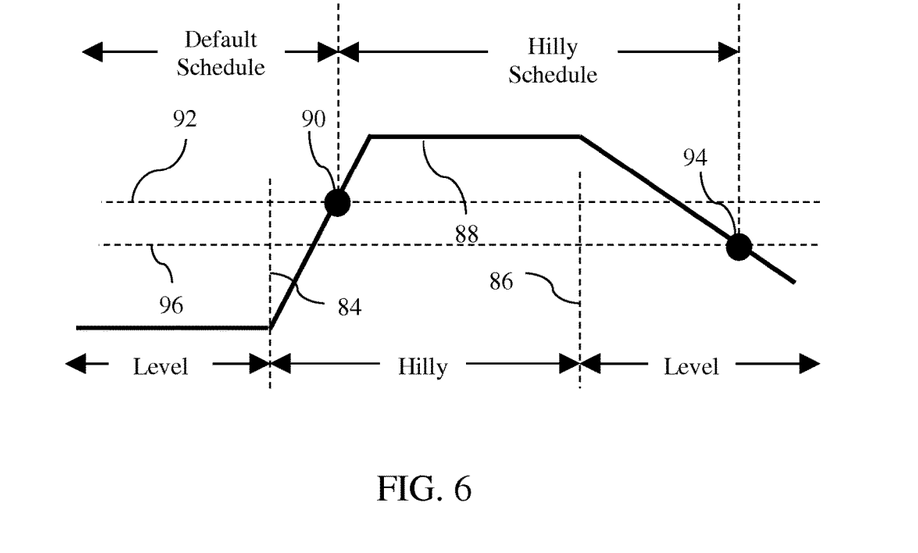
FIG. 6 is an illustration of a shift schedule selection using the method of FIG. 4.

FIG. 6 illustrates a shift scheduling selecting scenario using the above procedure. In this scenario, the terrain becomes mountainous at 84 and then becomes flat again at 86. The counter is represented by line 88. The counter begins increasing from zero at 84 and increases until it reaches the maximum counter value. Although this is illustrated as a straight line, the increase may be non-monotonic in some instances because the counter may decrease slightly during transitions from uphill grades to downhill grades or vice versa. The controller switches to the hilly shift schedule at 90 when the counter exceeds the hilly threshold 92. Notice that the vehicle has been driving in mountainous terrain for some time before the switch. Between 84 and 90, the controller shifts according to the default schedule which may result in the vehicle being in a higher than ideal gear ratio, shifting too often, and not providing engine braking on downhill grades. The counter begins decreasing at 86 when the terrain becomes flat. However, the controller does not switch back to the default shift schedule until 94 when the counter value drops below flat terrain threshold 96. Between 86 and 94, the vehicle may be in a lower than ideal gear ratio. Also, if the driver coasts to a stop, the vehicle will slow down faster than expected due to engine braking.

Figure 7:
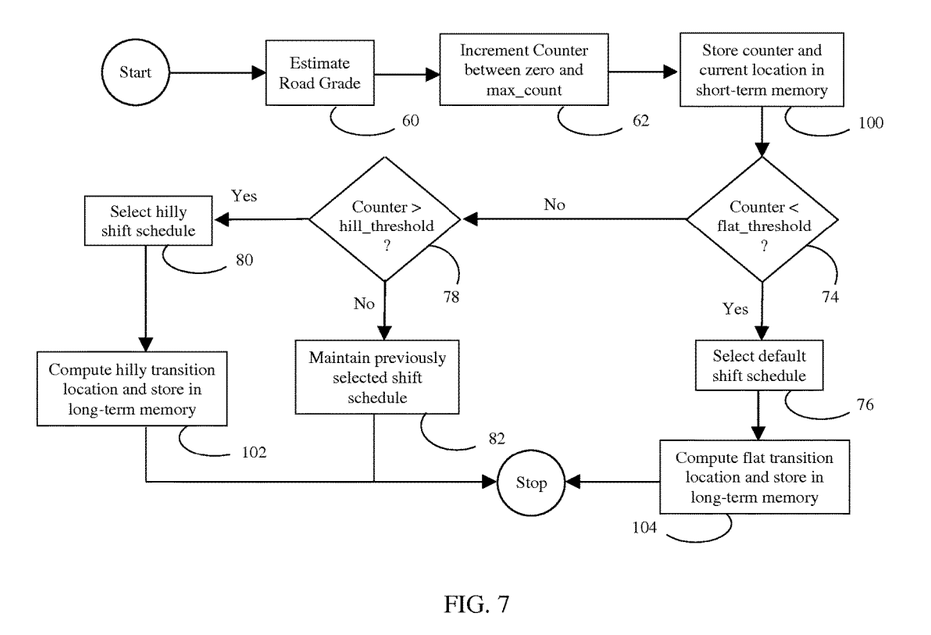
FIG. 7 is a flow chart for a process of selecting between two shift schedules and also storing information for future use.
Figure 8:
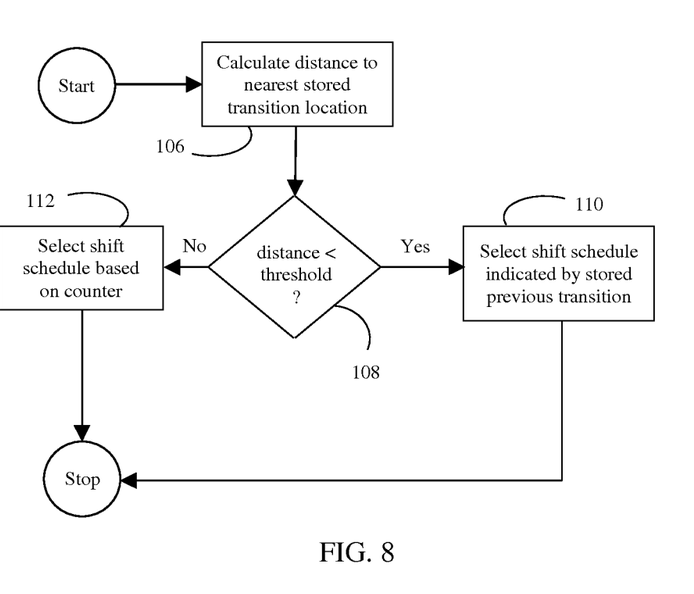
FIG. 8 is a flow chart for a process of selecting between two shift schedules utilizing the information stored in the process of FIG. 7.

FIGS. 7 and 8 describe an improved process for selecting the appropriate shift schedule that utilizes location information from a navigation system and stored information about previous shift schedule selections. The process of FIG. 7, like the process of FIG. 4, is executed at regular intervals, subject to exceptions such as when the vehicle is stationary. Steps that are identical to corresponding steps in FIG. 4 are identified with the same reference numerals. Several additional steps are included in order to store information to improve future shift schedule selection. After the counter is adjusted at 62, the current value of the counter and the current location are stored in memory. Since this information will be used within the same trip as it is stored, volatile memory such as RAM may be used. After selecting the hilly schedule at 80, if this is a change from the default shift schedule, the controller computes a location associated with the transition and stores that location for future use. Since that future use may be on another day, it is stored in a type of memory that is retained when the vehicle is off. Based on the information stored at 100, the controller determines a previously traversed location at which transitioning to the hilly schedule would have been desirable. For example, the location may be when the counter first exceeded a lower threshold than hilly threshold 92. Alternatively, it may be the most recent location at which the counter decreased by more than some threshold amount. Additionally, the controller may store the direction of travel at that time. In some embodiments, the location may be stored as a single point. In other embodiments, more complicated data structures may be used to represent a path that is traversed after the transition or a region. Similarly, after switching to the default shift schedule at 76, the controller stores a location associated with that transition at 104.

FIG. 8 illustrates a process for selecting a shift schedule based on a combination of the counter and the information stored in long term memory about previous transitions. At 106, the controller identifies the stored transition nearest to the present location and calculates the distance to the location associated with that transition. If the location is stored as a path or region, the distance may be calculated as the nearest distance to any point on the path or in the region. If the distance is less than a threshold, as determined at 108, then the controller selects the shift schedule indicated by that transition at 110. If the direction of travel is the same as the direction of travel for the stored transition, then the controller selects the shift schedule that was selected during the previous transition. If the direction of travel is opposite, the controller may select the opposite. If the distance is greater than the threshold, then the controller selects the based on the counter at 112 according to the flow chart of FIG. 7. As a consequence of utilizing the stored information, the controller transitions to the appropriate shift schedule at a more appropriate time.

For simplicity, the method has been described with respect to only two shift schedules. However, the method may be extended to multiple levels of shift schedules, each suited to progressively more hilly terrain. Alternatively or additionally, the counter may be based on criteria other than road gradient.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of selecting transmission gear ratios comprising:
    maintaining a counter indicating road gradient magnitudes over previously traversed territory;
    commanding shifts among discrete gear ratios using a first shift schedule based on changes in a measured speed and a driver demand;
    in response to the counter exceeding a threshold, selecting a second shift schedule and commanding shifts among the discrete gear ratios using the second shift schedule;
    upon selecting the second shift schedule, recording a location associated with the change in shift schedule; and
    in response to subsequent operation using the first shift schedule in a vicinity of the location, selecting the second shift schedule and commanding shifts among the discrete gear ratios using the second shift schedule before the counter exceeds the threshold.

2. The method of claim 1 wherein the measured speed is proportional to a transmission output shaft speed.

3. The method of claim 1 wherein the driver demand is based on an accelerator pedal position.

4. The method of claim 3 wherein the driver demand is a desired transmission output torque.

5. The method of claim 1 wherein the second shift schedule indicates operation at higher engine speed than the first shift schedule for a given measured speed and a given driver demand.

6. The method of claim 1 wherein the second shift schedule indicates use of gear states that provides engine braking for a given measured speed and a given driver demand at which the first shift schedule indicates use of a gear state with an over-running one-way clutch.

7. The method of claim 1 wherein the location associated with the change in shift schedule is a location that was traversed prior to the counter exceeding the threshold.

8. The method of claim 1 further comprising:
    maintaining a database of locations associated with changes in shift schedules; and
    using a vehicle navigation system to determine when a vehicle is operating within a threshold distance of one of the locations in the database.

9. A method of operating a vehicle comprising:
while traversing a route, shifting a transmission according to a first shift schedule;
in response to observed road gradients along the route, switching to a second shift schedule at a location; and
during a subsequent traversal of the route, switching to the second shift schedule before reaching the location based on navigation system data and stored data about the earlier shift schedule switch.

10. The method of claim 9 further comprising, after switching to the second shift schedule, downshifting at a measured speed and a driver demand at which no downshift would be performed according to the first shift schedule.

11. The method of claim 9 further comprising, after switching to the second shift schedule, maintaining a present gear state at a measured speed and a driver demand at which an upshift would be performed according to the first shift schedule.

12. The method of claim 9 further comprising, after switching to the second shift schedule, operating in a gear state that provides engine braking at a measured speed and a driver demand at which the first shift schedule would use a gear state with an over-running one-way clutch.

13. The method of claim 9 further comprising:
maintaining a database of locations associated with changes in shift schedules; and
using a vehicle navigation system to determine when the vehicle is operating within a threshold distance of one of the locations in the database.

14. A vehicle comprising:
a discrete ratio transmission;
a position determining system; and
a controller programmed to
shift the transmission according to a first shift schedule;
switch to a second shift schedule in response to retrospective observation of road gradient;
record a location associated with the switch; and
in response to subsequent proximity to the location, as determined by the position determining system, switch to the second shift schedule before reaching the location.

15. The vehicle of claim 14 wherein the controller is further programmed to, after switching to the second shift schedule, downshift the transmission at a measured speed and a driver demand at which no downshift would be performed according to the first shift schedule.

16. The vehicle of claim 14 wherein the controller is further programmed to, after switching to the second shift schedule, maintain a present gear state at a measured speed and a driver demand at which an upshift would be performed according to the first shift schedule.

17. The vehicle of claim 14 wherein the controller is further programmed to, after switching to the second shift schedule, operate in a gear state that provides engine braking at a measured speed and a driver demand at which the first shift schedule would use a gear state with an over-running one-way clutch.

* * * * *